Patented June 16, 1931

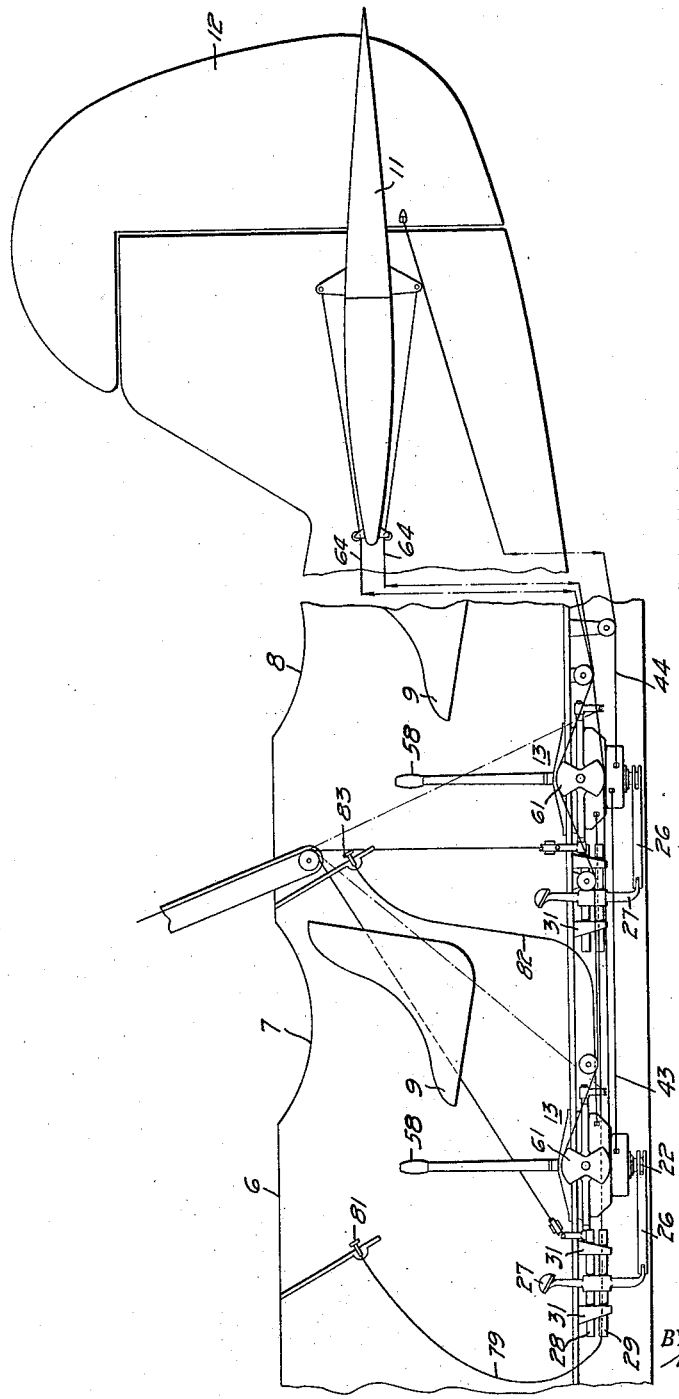

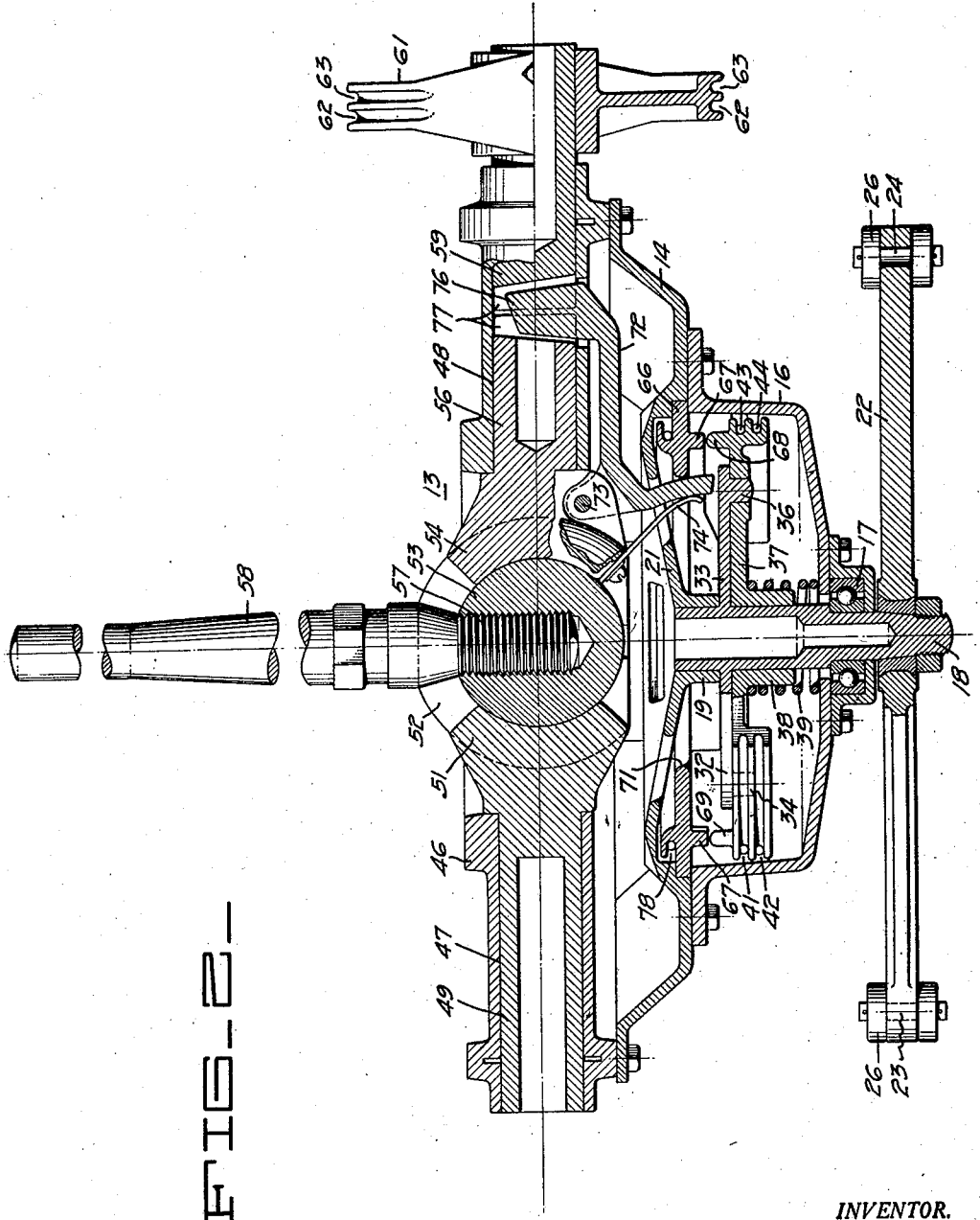

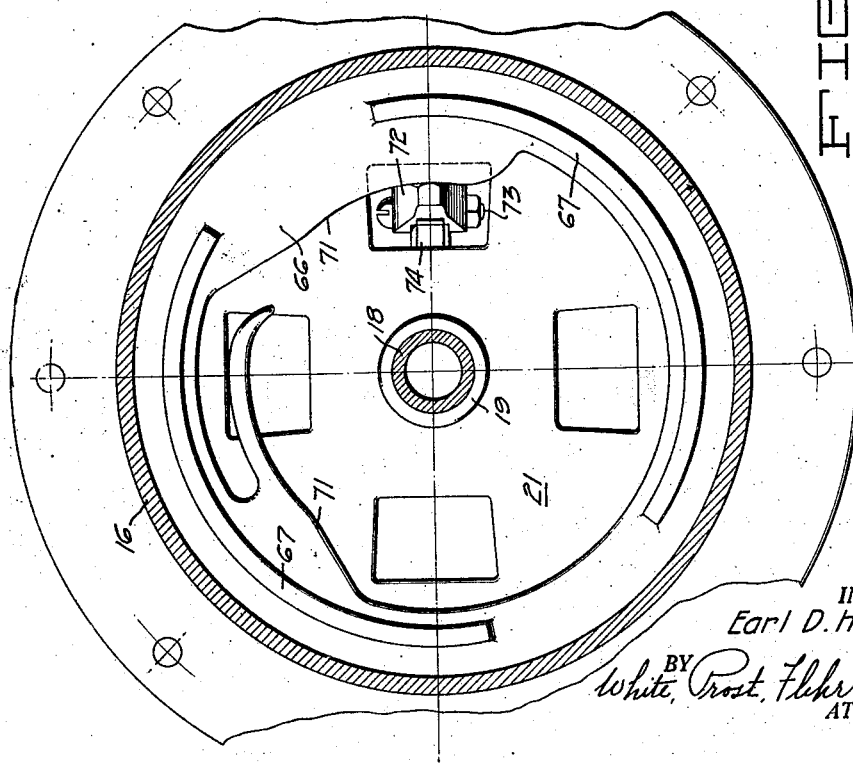

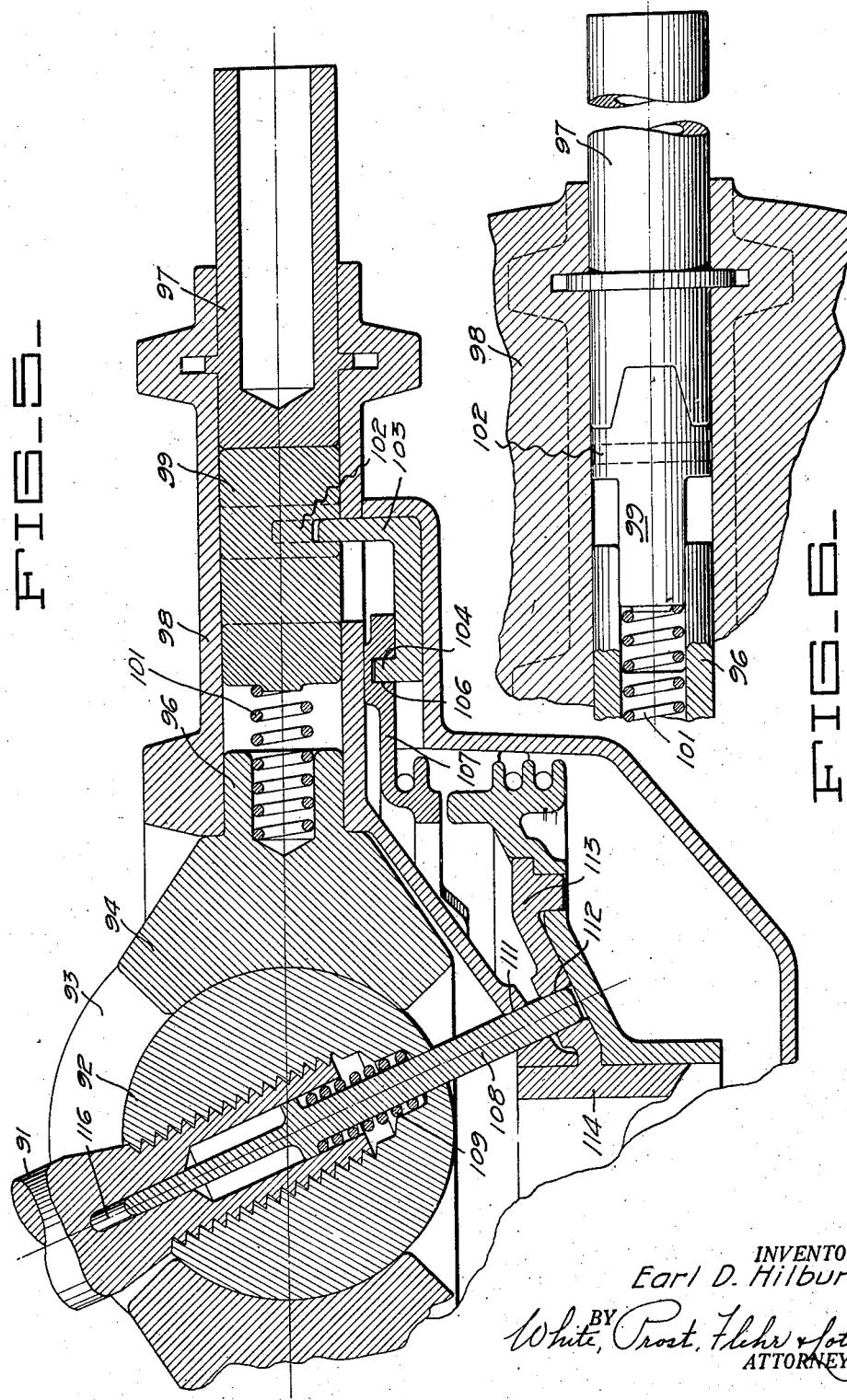

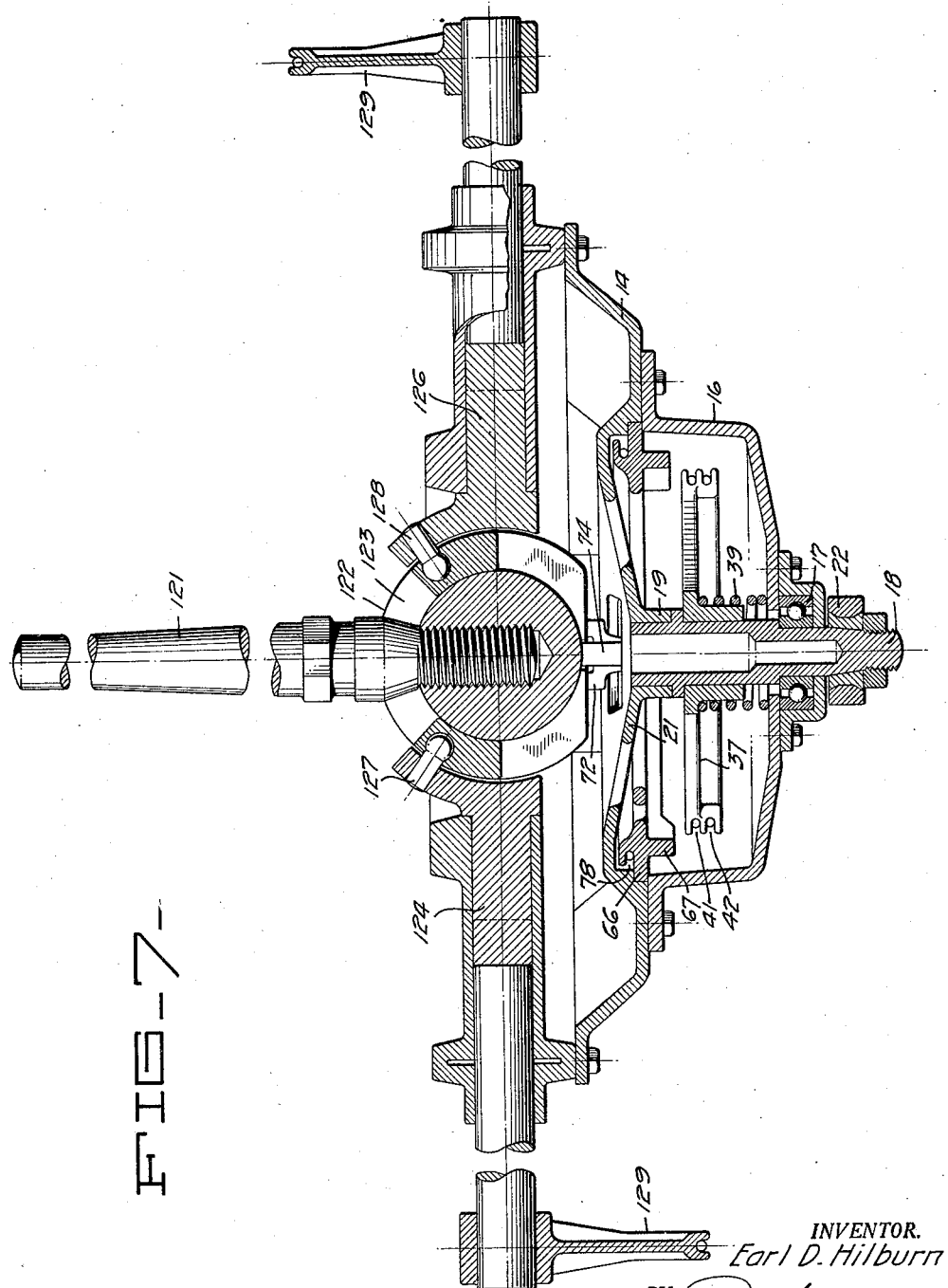

1,809,936

UNITED STATES PATENT OFFICE

EARL D. HILBURN, OF OAKLAND, CALIFORNIA

AIRPLANE CONTROL

Application filed September 9, 1929. Serial No. 391,284.

My invention relates to the control of airplanes and particularly is related to mechanisms for controlling airplanes which can be operated by more than one person. It is customary to provide training ships, among others, with dual control, so that the student and the instructor can simultaneously or alternately have complete control of the maneuvers of the airplane.

This arrangement, however, has led to some very serious accidents particularly in the case in which the student "freezes" to his particular set of controls and prevents proper control or operation by the pilot. It has even been necessary under these emergency conditions for the pilot forcibly to render the student unconscious so that his grip on the controls will be relaxed and so that the proper operation of the airplane can be resumed by the pilot.

It is an object of my invention to provide an airplane control which cannot be "frozen" by one of the operators thereof.

Another object of my invention is to provide an airplane control which can immediately be rendered inoperative from a point inaccessible to the pilot operating the control.

Another object of my invention is to provide a plurality of controls for an airplane any one of which can be instantaneously rendered inoperative.

The foregoing and other objects are attained in the embodiment of the invention shown in the drawings, in which Fig. 1 is a cross section on a longitudinal plane showing an airplane provided with the control of my invention, portions of the air plane being broken away to reduce the size of the figure.

Fig. 2 is a cross section transversely of one of the control units of my invention.

Fig. 3 is a plan of the rudder control plate.

Fig. 4 is a view from below of the cam release plate.

Fig. 5 is a transverse cross section showing a portion of a modified form of control unit of my invention.

Fig. 6 is a detail showing in plan the construction of one of the release mechanisms.

Fig. 7 is a longitudinal cross section of a control unit showing one form of aileron control.

In its preferred form, the airplane control of my invention includes control units operable from a plurality of control stations for maneuvering the airplane, coupled with means operative in either of the stations for disabling the control unit in the other station.

Although the control of my invention is useful in various different environments I have chosen to disclose it herein as it is applied to an airplane having dual controls. The airplane is provided with a fuselage 6 in the customary fashion having a forward cockpit 7 and an after cockpit 8. Each of the cockpits is provided with a pilot seat 9. The fuselage is extended rearwardly and terminates in the usual control surfaces such as the elevator 11 and the rudder 12. The airplane is also provided with ailerons, not shown, in the customary fashion.

In accordance with my invention I provide in each of the cockpits 7 and 8 a control unit, generally designated 13, which is effective to transmit the controlling movements of the pilot to the several control surfaces. Since the two control units shown herein are practically identical I shall describe but one of them. One form of control unit is disclosed in Fig. 2 which illustrates the unit in cross section transversely of the airplane and on a vertical plane. I preferably provide a housing 14 which is suitably secured to the framework of the fuselage 6 and is stationarily mounted with respect thereto. Secured to the housing 14 is a removable casing 16 which is centrally located and carries at its lower portion a bearing 17 for a central shaft 18. The shaft bears at its upper end in a pierced boss 19 forming part of an intermediate wall 21 of the housing 14. Secured to the lower end of shaft 18 is a transverse bar 22 having at its extremities suitable apertures 23 and 24 for the reception of links 26 extending forwardly to engage rudder pedals 27. It will be understood that there are a pair of rudder pedals and a pair of connecting links leading from each pedal to the extremities of the bar 22. Preferably, each pedal 27 is provided with a pair of parallel rods 28 and 29 which are slidable axially in brackets 31 secured to the framework of the fuselage 6. Forward and aft movement of the pedals 27 is therefore effective to oscillate the shaft 18 about its vertical axis.

In order to translate the oscillatory movement of shaft 18 into suitable movement for actuating the rudder 12 I preferably form integrally with the shaft 18 a pair of arms 32 and 33 which extend transversely of the fuselage and at their extremities carry depending lugs 34 and 36 adapted to be received in complementary apertures in a cable plate 37. The cable plate 37 is preferably an integral body having a central hub 38 rotatable about the shaft 18 and likewise axially displaceable thereon. The cable plate is normally held in the position shown in Fig. 2 by a coil spring 39 interposed between the cable plate and the casing 16. The periphery of the cable plate is preferably arcuate and carries an upper pair of grooves 41 and a lower pair of grooves 42. Preferably the pair of grooves 41 of the control unit in the front cockpit 7 receives a pair of control cables 43 which likewise are secured in the comparable pair of grooves 41 on the control unit in the rear cockpit 8. The pair of grooves 42 in the rear control unit, however, carries two control cables 44 which are suitably extended and secured to the rudder 12. By this train of mechanism, operation of the rudder pedals 27 in either the front cockpit 7 or the rear cockpit 8 is effective to operate the rudder 12 in exact accordance therewith. There is thus provided a dual control of the rudder.

I likewise prefer to provide a dual control for the elevator 11. To this end I preferably secure to the housing 14 a body 46 which is provided with aligned, transverse bores 47 and 48. In the bore 47 is preferably positioned a rotatable shaft 49 at its inner extremity carrying a crescent-shaped blade 51 adapted to be received in a circumferential slot 52 cut in a ball 53. Likewise seated in the continuation of slot 52 is a comparable blade 54 formed on the end of a shaft 56. The configuration of the blades 51 and 54 is such that they support the ball 53 between them. At the same time the ball is capable of limited rotation about a longitudinal axis without having any effect whatsoever upon the shafts 49 and 56. However, any rotation of the ball 53 about a horizontal transverse axis is effective to rotate the shafts 49 and 56 simultaneously and in equal amounts.

In order to afford control of the movement of the ball 53, I preferably insert therein, by a threaded connection 57, a stick 58 which extends into the cockpit and is readily accessible to the pilot. To make fore and aft movement of the stick 58 effective upon the elevator 11 I preferably provide in the bore 48 a shaft 59. For purposes of description, it will for the moment be considered that shaft 59 and shaft 56 are rigidly secured together and turn in unison. At the exposed extremity of shaft 59 I referably provide an interrupted pulley 61 having a pair of grooves 62 and a pair of grooves 63. The arrangement is such that the pair of grooves 62 on the forward unit 13 and the corresponding pair of grooves on the rearward unit 13 are connected together by cables for comparable movement while the pair of grooves 63 on the rear unit is connected by suitable cables 64 to the elevator 11. In this fashion there is provided mechanism for giving suitable movement to the elevator 11 upon operation in a fore and aft plane of the stick 58 in either or both cockpits 7 and 8.

Preferably I provide for movement of the ailerons, not shown, by means of a comparable system of cross shafts actuated by transverse movement of the stick 58. Usually such aileron mechanism is arranged in the units coplanar with but at 90 degrees to the shafts 49 and 56.

In order to release all of the mechanism for actuating the control surfaces from control of the stick 58 I preferably provide in the casing 16 a cam plate 66. This cam plate is rotatably mounted and carries a plurality of cam surfaces thereon. Depending from the plate is an axial cam 67 which is engageable upon rotation of the cam disc with lugs 68 and 69 on the disc 37. Relative movement therebetween causes the interengagement of the cam and lugs to translate the disc 37 axially along the shaft 18 and disengage the disc from lugs 34 and 36. This movement is thus effective to isolate the rudder pedals 27 from the cable 44 controlling the rudder.

In a similar fashion the cam disc 66 is provided with radial cam surfaces 71 which when revolved engage a bell crank 72 suitably pivoted as at 73, to the shaft 56 of the elevator control and a similar bell crank on the aileron control shaft, not shown. The bell crank is preferably urged in one direction by a leaf spring 74 while one arm of the bell crank is provided with a wedge 76 adapted to be introduced between co-operating wedge surfaces 77 on the shaft 56 and aligned shaft 59 respectively. When the wedge 76 is in the position shown in Fig. 2 the two shafts are locked together to turn in unison, as has previously been described, but upon the rotation of cam disc 66 and pivotal movement of the bell crank about the point 73, the wedge 76 is withdrawn from between the two shafts and disconnects them.

There is thus provided means for disconnecting the elevator controls and the aileron controls from influence by the stick 58 of one of the control units. Movement of the stick 58 is thus ineffective to actuate any of the control surfaces of the airplane. At the same time, however, the connection of these control surfaces with the other of the units 13 is in no wise affected.

To rotate the cam disc 66 and in order to afford a pilot remote from the stick 58 an opportunity to rotate the sam disc 66 and render the control unit 13 inoperative from a remote control station, I preferably provide on the cam disc a groove 78 in which a cable is fastened. The rear control unit 13 is provided with such a cable 79 which extends forwardly into the front cockpit 7 and is provided with a control handle 81. In a similar fashion the cam disc of the unit 13 in the forward cockpit 7 is provided with a control wire 82 leading to a control handle 83 in the rear cockpit 8. With such an arrangement the pilot in the front cockpit can disable the control unit in the rear cockpit while a pilot in the rear cockpit can disable the control unit in the front cockpit. Preferably the control handles 81 and 83 are readily removable so that if desired, the pilot sitting in one cockpit can in no way disable the control mechanism in the other cockpit.

In Figs. 5 and 6 I show a slightly modified form of my device which can be adopted in its entirety for both the aileron and elevator controls or for either of them. In this instance the stick 91 is provided with a ball 92 at its lower end and the ball is grooved peripherally as at 93 to receive a blade 94 on horizontally extending shaft 96. The shaft 96 is axially aligned with a shaft 97 which carries the control cables to the control surfaces. Both the shafts 96 and 97 are confined in a casing 98 and normally the shafts are connected by a sliding block 99 having a wedge shaped leading edge for effecting a tight connection between the shafts 96 and 97. A spring 101 biases the slide into engagement.

In order to retract the slide and thereby disconnect shaft 96 from shaft 97 I provide in the slide 99 a groove 102 into which fits a lug 103. The lug at its inner end is formed with an upturned flange 104 seated in a spiral cam groove 106 in a cam disc 107 which is actuated in the manner previously described. Rotation of the cam disc causes retractile movement or radial withdrawal of the lug 103 and thus extracts the slide 99 from the shaft 97 and prevents movement thereof in consonance with fore and aft movement of the stick 91.

In this modification of the invention I also provide means for locking the stick 91 against movement. The stick is preferably hollow and at its lower end carries a plunger 108 which is normally urged upwardly by spring 109. The plunger passes through an aperture 111 in the casing 98 and extends into an aligned aperture 112 in the extended arm 113 of a center shaft 114. When the plunger extends through both apertures 111 and 112 the mechanism is locked against movement. In order to hold the plunger in locked position, any suitable locking mechanism, not shown, can be provided at a convenient point on the stem 116 which controls the movement of the plunger.

An additional form of my invention particularly adapted to aileron control is shown in Fig. 7. In this modification, the control stick 121 at its lower end is received in a ball 122 having the customary groove 123 peripherally therearound. The ball is preferably supported as shown in Fig. 5 or in Fig. 2. To control the ailerons I preferably provide shafts 124 and 126, at their inner ends carrying pins 127 and 128 bearing in blocks slidable in the peripheral groove 123. Between their ends, the shafts 124 and 126 may be provided with either of the releasing devices previously described. Pulleys 129 at the extremities of each of the shafts 124 and 126 actuate cables in the usual fashion for operating the ailerons.

When the stick 121 moves in a plane perpendicular to the axis of shafts 124 and 126, the ailerons are moved identical amounts. When the stick is moved out of the perpendicular plane in order to actuate the elevator and at the same time is revolved about the axis of shafts 124 and 126, the pins 127 and 128 bear differing relations to the axis of rotation of the stick 121 and are therefore rotated different amounts to afford a differential amount of movement to the two ailerons.

It will be appreciated that in accordance with my invention I have provided a control unit useful in several control stations on aircraft in such a fashion that a pilot in one station can disable the control unit in the other station but also in such a fashion that complete control of the ship is in nowise endangered. Furthermore, I have provided a variety of means for releasing the individual control units and for locking the same and in addition for affording differential movement to the ailerons.

It is to be understood that I do not limit myself to the form of the airplane control shown and described herein, as the invention, as set forth in the following claims may be embodied in a plurality of forms.

I claim:

1. A control for surfaces on an airplane comprising a first member movable to control a surface on the airplane, means for moving said member to control the surface, a second member movable to control another surface on the airplane, means for moving said second member to control the another surface, means for disabling the first member whereby the means for moving the first member is ineffective to control the surface, a second disabling means for rendering the second member disabled so that the means for moving the second member is ineffective to control the another surface; and a cam member rotatable to engage both the disabling means and to vary the disabling means whereby the moving means are enabled and disabled.

2. A control for surfaces on an airplane comprising a first member rotatably mounted, a second member rotatably mounted, control means associated with each of the members, said control means being adapted for connection to surfaces on the airplane, members for engaging each of the rotatable members with the associated control means so that rotation of the members is effective to vary the surfaces on the airplane, and a cam member movable to cause said engaging members to enable or disable the engagement of the rotatable members and the associated control means.

3. A control for surfaces on an airplane comprising a first member rotatably mounted, a second member rotatably mounted, control means associated with each of the members, said control means being adapted for connection to surfaces on the airplane, bell cranks for movement to engage each of the rotatable members with the associated control means so that rotation of the members is effective to vary the surfaces on the airplane, and a cam member movable to engage both of said bell cranks to enable or to disable engagement of the rotatable members and the associated control means.

4. A control for surfaces on an airplane comprising a first member rotatably mounted, a second member rotatably mounted, a stick functionally joined to said second member, said second member and said first member being adapted to permit simultaneous or independent rotation of each of said members, control means associated with each of the members, said control means being adapted for connection to surfaces on the airplane, members for engaging each of the rotatable members with the associated control means so that rotation of the members is effective to vary the surfaces on the airplane, and a cam member movable to cause said engaging members to enable or disable the engagement of the rotatable members and the associated control means.

5. A control for surfaces on an airplane comprising a first member rotatably mounted, a second member rotatably mounted, control means associated with each of the members, said control means being adapted for connection to surfaces on the airplane, members for engaging each of the rotatable members with the associated control means so that rotation of the members is effective to vary the surfaces on the airplane, a third member rotatably mounted and adapted to vary surfaces on the airplane upon rotation, means for moving said third member, another engaging member adapted to engage the third member with the moving means for movement, and a cam member movable to cause said engaging members to enable or disable the engagement of the rotatable members and the associated control means.

6. A control for an airplane having a plurality of control surfaces comprising a housing, a first shaft mounted for rotation in said housing, a second shaft mounted for rotation in said housing, control means for said control surfaces associated with each of said shafts, bell cranks pivoted on said housing for engaging each of the shafts with the associated control means, and a cam plate rotatably mounted to engage the bell cranks to enable and disable engagement of the shafts with the associated control means.

7. In a control for surfaces on an airplane, a ball having a pair of functionally continuous grooves, members engaged with one of the grooves, other members engaged with the other groove, said members being effective to vary surfaces on the airplane, and a stick adapted to move the ball to vary said members simultaneously or independently to control the surfaces on the airplane.

8. In a control for surfaces on an airplane, a ball having a pair of functionally continuous grooves, members engaged with one of the grooves, other members engaged with the other groove, said members being effective to vary surfaces on the airplane, a stick adapted to move the ball to vary said members simultaneously or independently to control the surfaces on the airplane, and means for enabling and disabling the effectiveness of said members whereby the stick is rendered effective or ineffective to control the surfaces on the airplane.

9. In a control for surfaces on an airplane, a ball having a pair of functionally continuous grooves, members engaged with one of the grooves, other members engaged with the other groove, said members being effective to vary surfaces on the airplane, and a stick adapted to move the ball to vary said members simultaneously or independently to control the surfaces on the airplane, said other members being cooperatively engaged with the other groove to provide for a differential amount of movement between surfaces on the airplane varied by said other members upon movement by the stick to move said other members.

In testimony whereof, I have hereunto set my hand.

EARL D. HILBURN.